Jan. 14, 1964  K. STEISSLINGER  3,117,504
FILM SPEED SETTING DEVICE FOR CAMERAS
Filed Aug. 27, 1962  2 Sheets-Sheet 1

KURT STEISSLINGER
*INVENTOR.*
BY
ATTORNEY & AGENT

Jan. 14, 1964 K. STEISSLINGER 3,117,504
FILM SPEED SETTING DEVICE FOR CAMERAS
Filed Aug. 27, 1962 2 Sheets-Sheet 2

KURT STEISSLINGER
*INVENTOR.*

BY
ATTORNEY & AGENT

United States Patent Office 3,117,504
Patented Jan. 14, 1964

3,117,504
FILM SPEED SETTING DEVICE FOR CAMERAS
Kurt Steisslinger, Stuttgart-Hedelfingen, Germany, assignor to Eastman Kodak Company, Rochester, N.Y., a corporation of New Jersey
Filed Aug. 27, 1962, Ser. No. 219,415
7 Claims. (Cl. 95—10)

The invention relates to a photographic or cinematographic camera having a photoelectric exposure control system and more particularly to a camera having means for adjustment of such exposure control system in accordance with the speed of the photo-sensitive film to be used.

One type of camera having a photoelectric exposure control system is provided with means for variably positioning an index scale relative to a film speed scale for selecting the desired film speed. The indicating needle of an integral light meter can be aligned with the selected film speed number to identify the proper setting of the diaphragm opening and/or the shutter speed.

More recently, cameras have been developed which are provided with means for presetting a diaphragm-shutter relation, directly or indirectly, according to the selected film speed, with subsequent actual setting of the diaphragm aperture and shutter speed as a function of scene brightness and in accordance with the preset diaphragm-shutter relation. The present invention is most suitable in this type of camera wherein the presetting operation adjusts the position of the measuring instrument of an integral exposure meter or follow-up pointer for use with a light meter.

An important object of the present invention, therefore, is to provide a device for presetting a selected film speed, thereby selectively presetting a diaphragm-shutter relation that will be a function of film speed.

Another object of the invention is to provide a film speed setting and indicating device which can be coupled to the adjusting mechanism that determines the diaphragm opening or shutter speed as a function of scene brightness.

Still another object of the invention is to provide a film speed scale plate and an index plate as a part of the setting mechanism, wherein the plates are normally maintained in frictional engagement for movement as a unit and movable relative to one another for presetting a selected film speed number.

And yet another object of the invention is to provide a film speed setting device comprising a friction clutch that normally maintains the film speed scale plate and index plate as a unit to transmit the diaphragm-shutter relation to the light meter after the film speed number has been selected and set, and engaging means for overcoming the clutch to permit presetting a different film speed number by setting one plate relative to the other.

Other objects and advantages will, of course, become apparent to those skilled in the art from the following detailed description. Reference is now made to the accompanying drawings wherein like reference numerals designate like parts and wherein.

Figure 1:
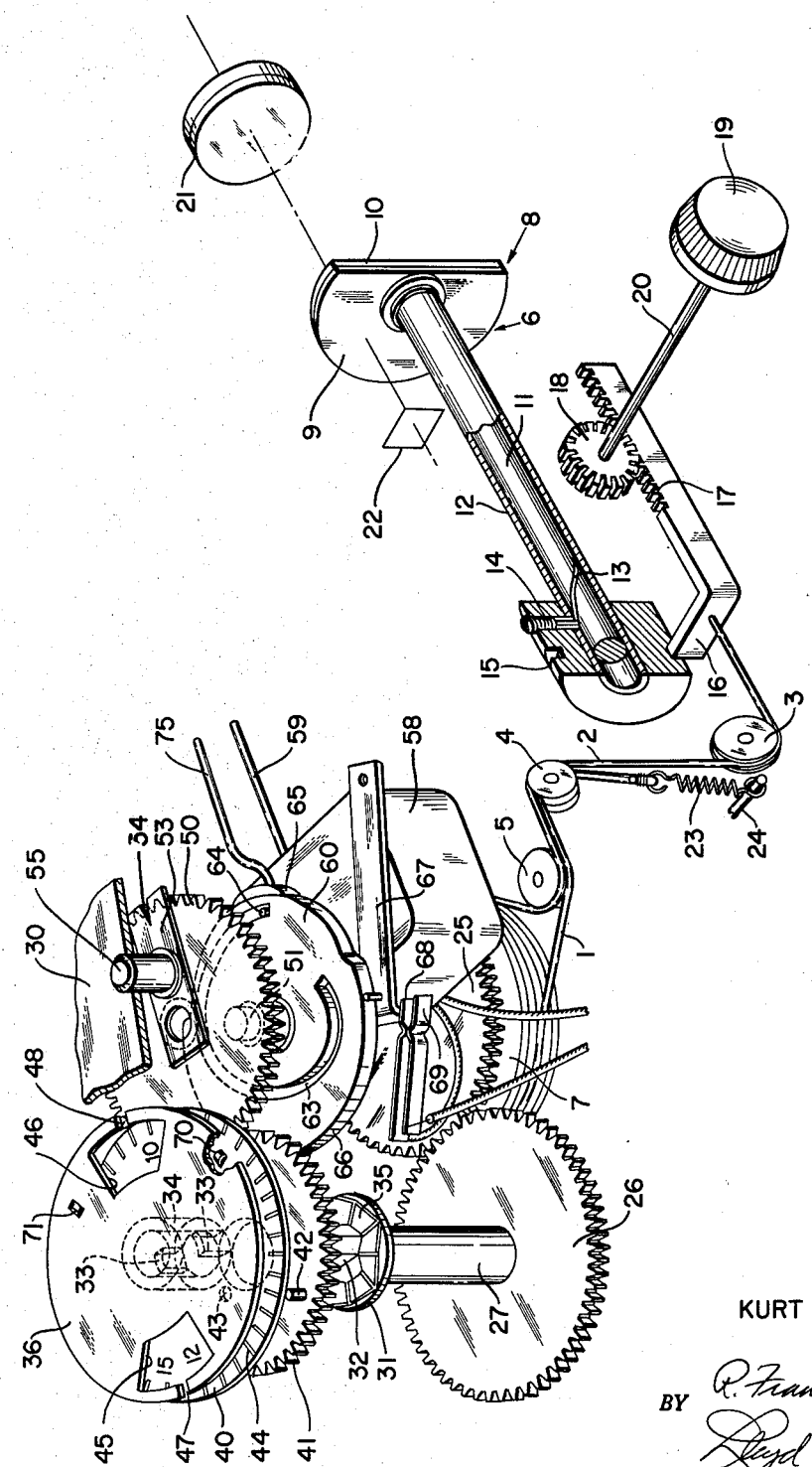
FIG. 1 is a partially exploded perspective view of the film speed setting mechanism according to the invention, including the immediately adjacent parts of the mechanism for transmitting the film speed setting to the exposure meter.

As shown, numeral 1 represents a cable transmission device by which the cable 2 in conjunction with idler pulleys 3, 4 and 5 connects the shutter mechanism 6 of a cine camera with a rotatable cable drum 7. The shutter mechanism per se forms no part of the invention other than to disclose an arrangement by which the film speed setting device can actually be connected thereto for presetting a shutter opening as a function of the film speed. As is well-known in the art, the shutter 8 comprises a fixed blade 9 and a blade 10 which can be moved relative to blade 9 to establish a desired shutter opening. Blade 10 is fixed to shaft 11 and blade 9 is mounted on the hollow shaft 12 which is concentric with shaft 11, the shafts being driven as a unit and the angular opening between the blades being adjustable by means of the peripheral cam slot 13 in shaft 11 and the stud 14 which extends through an aperture in shaft 12 and is carried by the sleeve 15 slidably mounted on shaft 12. Sleeve 15 is moved axially along shaft 12 by the arm 16 of rack 17, which is driven by the pinion 18. Knob 19 which is located on the outside of the camera is connected by shaft 20 to pinion 18 and by rotation of said knob relative to a scale, not shown, the angular opening between blades 9 and 10 can be varied. A lens system 21 is aligned with the exposure aperture 22 past which a strip of light-sensitive film is moved intermittently in a well-known manner. One end of cable 2 is connected to the arm 16, said cable passing around guide pulleys 3, 4 and 5, drum 7, pulleys 4 and 5 and having the other end connected to an end of spring 23 that is connected at the other end to a fixed pin 24. The drum 7 can be connected in a similar manner to the diaphragm mechanism which can comprise a known type of iris diaphragm having a ring coaxial with the lens axis for selecting the diaphragm aperture and to which the cable 2 can be connected such that rotation of the ring drives the cable 2 which, in turn, drives cable drum 7.

Coaxially fixed to cable drum 7 is a gear 25 which meshes with gear 26. Gear 26, in turn, is mounted at one end of a support member or shaft 27. The bearing or support 28 for shaft 27, as well as the support 29 for the stub shafts (not shown) on which pulley 5 and drum 7 and gear 25 are rotatable, can be part of the camera casing 30, see FIG. 2. Shaft 27 has intermediate its ends a circular flange portion 31 and adjacent flange 31 the shaft 27 is provided with a portion 32 having flat faces which are engaged by the keying recesses 33 in the sleeve 34. A circular disk spring washer 35 is disposed on the upper surface of the flange portion 31 and has a radial wave form, said washer can be of any bell type that is capable of operating as a clutch by frictionally transmitting rotary motion when compressed.

Figure 2:
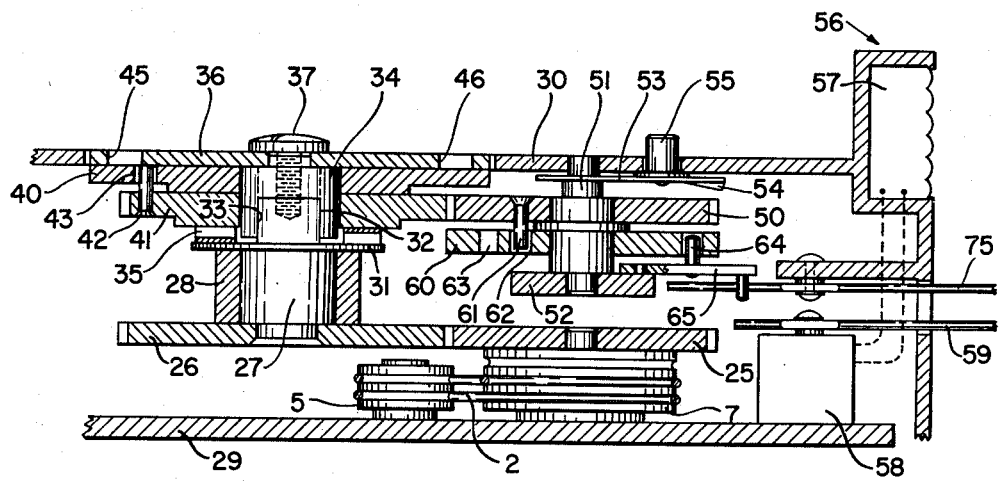
FIG. 2 is a vertical section through the mechanism shown in FIG. 1 with the various parts in an operable relation.
Figure 3:
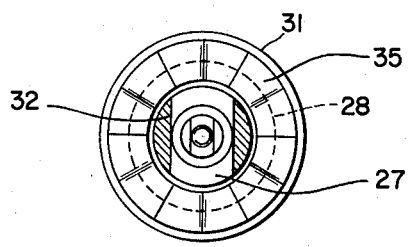
FIG. 3 is a partial section and plan view of the shaft and spring member thereon which support the index and scale plates.

An index plate 36 is secured to sleeve 34 and shaft 27 by means of screw 37, as shown in FIG. 2. The sleeve 34 is provided with diametrical keying recesses 33 each of which engage the flat faces on portion 32 of shaft 27. The sleeve 34 lies within the inner diameter of washer 35 and its length is less than the distance between the under surface of index plate 36 and the upper surface of flange 31 so as not to interfere with the action of spring washer 35.

Below the index plate 36, film speed scale plate 40 and gear 41 are mounted on sleeve 34 so as to be freely rotatable with respect thereto, the outer surface of sleeve 34 serving as a bearing for plate 40 and gear 41. Pin 42 on gear 41 engages the hole 43 in scale plate 40 so as to prevent relative rotary motion between the scale and gear and, at the same time, permitting the plate and gear to be rotated as a unit. Gear 41 provides the second surface against which spring washer 35 acts, the upper surfaces of flange 31 providing the other.

Scale plate 40 is provided with scale markings 44 that correspond to the ASA and DIN film speed values which are well-known in the art. Index plate 36 is provided with apertures 45 and 46 for viewing of the respective film speed numbers and each of the apertures is provided with an index 47 and 48, respectively. Screw 37 threadably engages a threaded hole in the end of shaft 27, thereby securing index plate 36 and sleeve 34 to shaft 27 and also clamping scale plate 40 and gear 41 between index plate 36 and flange 31 with the result that spring washer 35 is maintained in a compressed state.

Meshing with gear 41 is a spur gear 50 that is rotatably mounted on stub shaft 51 which is journaled in support plate 52 and camera casing 30. Axially displaced from gear 50 on shaft 51 is a holding plate 53 having a projection 54 for engaging the teeth of gear 50. In the embodiment shown, plate 53 comprises a leaf spring having one end mounted on stub shaft 51 and the other end defining the projection 54, the projection normally being out of engagement with gear 50 when the leaf spring is relaxed. Push button 55 is fixed to the free end of spring plate 53 and extends through an opening in casing 30 so as to be accessible from the outside of the camera.

A light measuring device 56 comprising a photocell 57; a galvanometer coil, generally indicated by the numeral 58 and including an indicating needle 59 is arranged at the front of the camera as is well-known in the art. A plate cam 60 coaxial with gear 50 and rotatable thereby through a cooperating pin 61 on gear 50 and hole 62 in cam 60 is provided with a cam slot 63 that is designed to control the movement of an eccentric crank pin 64 on plate 65 to adjust the position of the matching needle 75 in accordance with a predetermined diaphragm-shutter relation, as described hereinafter. Cam 60 can also include an outer cam surface 66, see FIG. 1, cooperating with a pivotable arm and pin 67 which can, in turn, close a pair of electrical contacts 68 and 69 to provide an indicating means at a given setting, such as a colored light.

In order to set the film speed number of the film to be used into the camera to establish a diaphragm-shutter relation, button 55 is pushed downwardly toward the camera casing 30. This urges the end of spring plate 53 toward gear 50 until projection 54 engages the space between two teeth on the gear, thereby preventing rotation of gears 50 and 41, as well as cam plate 60 and scale plate 44. Knob 19 is then turned to vary the opening formed by shutter blades 9 and 10, this motion being transmitted by pinion 18 to the rack 17 to move it to the right or left in accordance with the shutter opening desired. The movement of rack 17 causes sleeve 15 to be moved axially along shaft 12 and since the sleeve 15 cannot be rotated, by means of stud 14 and cam slot 13, shutter blade 10 is moved relative to blade 9. This same movement is transmitted via cable 2 to drum 7, spring 23 expanding as the arm 16 is moved to the right and contracting as the arm 16 is moved to the left. Spring 23 exerts a force on cable 2 sufficient to rotate drum 7 but which is not sufficient to effect the positioning of rack 17 as a result of being set in a particular position by knob 19.

The rotary movement of drum 7 is transmitted to shaft 27 by means of gears 25 and 26 and since the rotation of gears 41 and 50 is inhibited by projection 54, only index plate 36 can be rotated. As a result, either index 47 or 48 is positioned relative to its DIN or ASA number, such movement of shaft 27 overcoming the frictional force exerted by washer 35. In order to prevent the indexes 47 and 48 from overrunning their respective scales, a protuberance 70 can be formed upwardly from scale plate 40 and a protuberance 71 can be formed downwardly from index plate 36. These protuberances are arranged with respect to the scale markings 44 so that when either index 47 or 48 reaches either limit of its respective scale markings, the protuberances 70 and 71 will abut. Further movement of shaft 27 under such a condition will cause gear 41 to be rotated, due to pin 42 interconnecting gear 41 and scale plate 40, and the movement of gear 41 will rotate gear 50, thereby causing the projection 54 to flex in an upward direction and ride out of its engagement with the teeth of gear 50. This can be accomplished because of the cross-sectional cam shape of projection 54 and the fact that plate 53 is resilient and button 55 is arranged intermediate shaft 51 and projection 54. Assuming that either the index 47 or 48 has been set with respect to the selected film speed number, the button 55 is then released. This setting of the film speed number has also produced a shutter opening which can be said to be a function of the film speed number.

In order to obtain a shutter opening that is a function of scene brightness, the camera is directed toward the scene and the light incident on the photocell 57 causes the coil to rotate and position the needle 59 in accordance with the incident light in a well-known manner. The knob 19 is then rotated to adjust the shutter opening in accordance with the light incident on the cell 57. As knob 19 is rotated in either direction, this motion is transmitted to drum 7 by cable 2 and by means of gears 25 and 26, shaft 27 is rotated. Due to the force exerted by spring washer 35 on gear 41, gear 41, scale plate 40 and index 36 are rotated as a unit with shaft 27 and, since button 55 has not been depressed, gear 50 and plate cam 60 are also rotated. With the rotation of plate cam 60, pin 64 is moved by slot 63 to position needle 75 relative to needle 59. When the two needles 59 and 75 are matched position-wise, then the shutter opening has been adjusted as a function of scene brightness as well as film speed.

As stated hereinbefore, the film speed number can be preset by means of the shutter mechanism as described in conjunction with the disclosed embodiment of the invention or by a similar connection to the diaphragm. In either case, a predetermined diaphragm-shutter relation is obtained as a function of the film speed. Various other changes may be suggested to those skilled in the art; however, the invention is not to be limited to the particular embodiment disclosed and described herein but is of a scope as defined by the appended claims.

I claim:
1. In a camera having an exposure regulating device movable into a plurality of positions for varying the exposure of film in said camera, and an exposure meter disposed for energization by scene light, said meter having an output member positionable as a function of the energization of said meter, a film speed setting device comprising in combination:

an axially mounted support means adapted to be moved angularly in response to movement of said exposure regulating device;

a first film speed member fixed to said support means for movement therewith;

a second film speed member mounted coaxially with and independently of said support means;

friction means normally coupling said first and second film speed members for movement as a unit to maintain a preset film speed relation therebetween and adapted to permit movement of one of said film speed members relative to the other;

an exposure control means adapted to be positioned in coincidence with the position of said output member;

a first drive means operatively connecting said exposure regulating device and said support means for moving said support means as said exposure regulating device is moved into one of said positions to vary the exposure;

a second drive means operatively connecting said second film speed member to said control means for moving said control means in response to movement of said exposure regulating device, thereby to position said control means in coincidence with said output member to establish the exposure as a joint function of the preset film speed and said scene light; and means for selectively engaging said second drive means to hold said control member and said second film speed member in a fixed position as the exposure is varied by said exposure regulating means for positioning said first film speed member relative to said second film speed member for presetting a selected film speed.

2. In a camera having an exposure regulating device movable into a plurality of positions for varying the exposure of film in a camera, and an exposure meter disposed for energization by scene light, said meter having an output member positionable as a function of the energization of said meter, a film speed setting device comprising in combination:

an axially mounted support member adapted to be moved angularly in response to movement of said exposure regulating device;

an index member fixed to said support member for movement therewith;

a film speed scale member mounted coaxially with and independently of said support member;

friction means normally coupling said scale member and said index member for movement as a unit to maintain a preset film speed relation therebetween and adapted to permit movement of said index member relative to said scale member;

an exposure control means adapted to be positioned in coincidence with the position of said output member;

a first drive means operatively connecting said exposure regulating device and said support member for moving said support member as said exposure regulating device is moved into one of said positions to vary the exposure;

a second drive means operatively connecting said scale member to said control means for moving said control means in response to movement of said exposure regulating device to position said control means in coincidence with said output member to establish the exposure as a joint function of the preset film speed and said scene light; and means for selectively engaging said second drive means to hold said control means and said scale member in a fixed position as the exposure is varied by said exposure regulating means for positioning said index member relative to said scale member for presetting a selected film speed.

3. A film speed setting device in accordance with claim 2 and including a first stop member on said index member and a second stop member on said scale member, said stop members being arranged on their respective members so as to abut one another at either limit of movement of said index member relative to said scale member whereby said index member and said scale member are moved as a unit and said engaging means is releasably disengaged from said second drive means to render the same operative.

4. A film speed setting device in accordance with claim 2 wherein said friction means comprises a resilient member arranged between a flange on said support member and said scale member for holding said scale member in frictional engagement with said index member for movement therewith.

5. A film speed setting device in accordance with claim 2 wherein said engaging means comprises a resilient member having a projection adapted to be moved into engagement with said second drive means.

6. A film speed setting device in accordance with claim 2 wherein said second drive means comprises a drive member on said support member and a driven member including a cam for positioning said control means relative to said output member.

7. A film speed setting device in accordance with claim 6 wherein said engaging means comprises a resilient member having a projection adapted to be moved into engagement with said driven member for holding said control means and said scale member in a fixed position.

References Cited in the file of this patent

UNITED STATES PATENTS

| | | |
|---|---|---|
| 2,849,936 | Fahlenberg | Sept. 2, 1958 |
| 2,953,978 | Rentschler | Sept. 27, 1960 |
| 3,001,460 | Broschke | Sept. 26, 1961 |
| 3,026,783 | Winkler | Mar. 27, 1962 |
| 3,069,969 | Winkler | Dec. 25, 1962 |